United States Patent
Zellhuber et al.

(10) Patent No.: US 12,458,943 B2
(45) Date of Patent: Nov. 4, 2025

(54) REACTOR AND METHOD FOR CARRYING OUT A CHEMICAL REACTION

(71) Applicants: LINDE GMBH, Pullach (DE); BASF SE, Ludwigshafen (DE)

(72) Inventors: Mathieu Zellhuber, Martinsried (DE); Martin Hofstätter, Munich (DE); Heinz Posselt, Bad Aibling (DE); Christian Lang, Munich (DE); Robert Stegemann, Munich (DE); Anton Wellenhofer, Hohenschäftlarn (DE); Volker Jeromin, Altenmarkt a. d. Alz (DE); Peter Reiser, Münsing (DE); Georg Kiese, Zorneding (DE); Christian Ziegler, Munich (DE); Andrey Shustov, Ludwigshafen am Rhein (DE); Eric Jenne, Hassloch (DE); Kiara Aenne Kochendörfer, Mannheim (DE); Heinrich Laib, Limburgerhof (DE); Heinz-Jürgen Kühn, Westhofen (DE); Reiner Jacob, Hochspeyer (DE); Clara Delhomme-Neudecker, Munich (DE)

(73) Assignee: Linde GmbH, Pullach (DE)

( * ) Notice: Subject to any disclaimer, the term of this patent is extended or adjusted under 35 U.S.C. 154(b) by 656 days.

(21) Appl. No.: 17/906,176

(22) PCT Filed: Mar. 11, 2021

(86) PCT No.: PCT/EP2021/056207
§ 371 (c)(1),
(2) Date: Sep. 12, 2022

(87) PCT Pub. No.: WO2021/180856
PCT Pub. Date: Sep. 16, 2021

(65) Prior Publication Data
US 2023/0115461 A1 Apr. 13, 2023

(30) Foreign Application Priority Data

Mar. 13, 2020 (EP) .................................. 20163140

(51) Int. Cl.
*B01J 19/00* (2006.01)
*B01J 19/24* (2006.01)
*C01B 3/34* (2006.01)

(52) U.S. Cl.
CPC ....... *B01J 19/0013* (2013.01); *B01J 19/2425* (2013.01); *C01B 3/34* (2013.01);
(Continued)

(58) Field of Classification Search
CPC ......... B01J 8/00; B01J 8/02; B01J 8/06; B01J 8/067; B01J 19/00; B01J 19/0006;
(Continued)

(56) References Cited

U.S. PATENT DOCUMENTS 1,985,680 A 12/1934 Mapes
5,204,071 A 4/1993 Carter et al.
(Continued)

FOREIGN PATENT DOCUMENTS

CN 101150894 A 3/2008
DE 2362628 A1 6/1975
(Continued)

OTHER PUBLICATIONS

Translation of International Search Report dated Jun. 8, 2021, 2 pages, issued in PCT App. No. PCT/EP2021/056207.
(Continued)

*Primary Examiner* — Natasha E Young
(74) *Attorney, Agent, or Firm* — Avek IP, LLC

(57) ABSTRACT

A reactor includes a reactor vessel and one or more reaction tubes A number of tube sections of the one or more reaction tubes in each case run between a first region and a second
(Continued)

region in the reactor vessel. For the electrical heating of the tube sections, the tube sections in the first region can be electrically connected to (a) current connection(s) of a current source. In the first region, current feed arrangements are provided; in each case one or in each case one group of the tube sections are electrically connected, and each comprise (a) contact passage(s) that in each case adjoin(s) at least one of the tube sections in the first region. A wall of the contact passages in each case is connected to a current feed element that has a rod-shaped section that runs at a wall passage through a wall of the reactor vessel.

20 Claims, 8 Drawing Sheets

(52) U.S. Cl.
CPC .............. *B01J 2219/00135* (2013.01); *C01B 2203/0233* (2013.01); *C01B 2203/0238* (2013.01); *C01B 2203/085* (2013.01)

(58) Field of Classification Search
CPC ...... B01J 19/0013; B01J 19/08; B01J 19/087; B01J 19/24; B01J 19/2415; B01J 19/2425; B01J 2208/00; B01J 2208/00008; B01J 2208/00017; B01J 2208/00106; B01J 2208/00168; B01J 2208/00389; B01J 2208/00407; B01J 2208/00415; B01J 2219/00; B01J 2219/00049; B01J 2219/00051; B01J 2219/00132; B01J 2219/00135; C01B 3/00; C01B 3/02; C01B 3/32; C01B 3/34; C01B 3/38; C01B 2203/00; C01B 2203/02; C01B 2203/0205; C01B 2203/0227; C01B 2203/0233; C01B 2203/0238; C01B 2203/0266; C01B 2203/0277; C01B 2203/08; C01B 2203/0805; C01B 2203/085
See application file for complete search history.

(56) References Cited

U.S. PATENT DOCUMENTS

| | | | |
|---|---|---|---|
| 6,191,332 B1 | 2/2001 | Duee et al. | |
| 6,296,814 B1 | 10/2001 | Bonk et al. | |
| 9,347,596 B2 | 5/2016 | Wortmann et al. | |
| 9,908,091 B2 | 3/2018 | Vogel et al. | |
| 2004/0015012 A1 | 1/2004 | Hammon et al. | |
| 2010/0105944 A1 | 4/2010 | Buturla et al. | |
| 2012/0241677 A1 | 9/2012 | Perkins et al. | |
| 2012/0328269 A1 | 12/2012 | Ellinger et al. | |
| 2014/0238523 A1 | 8/2014 | Wortmann et al. | |
| 2015/0010467 A1 | 1/2015 | Ito et al. | |
| 2015/0122802 A1 | 5/2015 | Zikeli et al. | |
| 2016/0288074 A1 | 10/2016 | Vogel et al. | |
| 2017/0101312 A1* | 4/2017 | Mihailowitsch | ........ C01B 3/384 |
| 2018/0208525 A1 | 7/2018 | Schoonebeek et al. | |
| 2019/0002389 A1 | 1/2019 | Horstmann et al. | |
| 2020/0299131 A1 | 9/2020 | Finnerty et al. | |
| 2021/0071007 A1 | 3/2021 | Hardman et al. | |
| 2021/0179948 A1 | 6/2021 | Kochendoerfer et al. | |
| 2023/0115461 A1 | 4/2023 | Zellhuber et al. | |
| 2023/0116690 A1 | 4/2023 | Posselt et al. | |
| 2023/0211305 A1 | 7/2023 | Hofstätter et al. | |
| 2023/0226511 A1 | 7/2023 | Hofstätter et al. | |
| 2023/0285929 A1 | 9/2023 | Posselt et al. | |
| 2023/0302426 A1 | 9/2023 | Zellhuber et al. | |
| 2023/0356176 A1 | 11/2023 | Lang et al. | |
| 2023/0398513 A1 | 12/2023 | Hofstatter et al. | |
| 2024/0100498 A1 | 3/2024 | Hofstatter et al. | |
| 2024/0123421 A1 | 4/2024 | Zellhuber et al. | |
| 2024/0207811 A1 | 6/2024 | Zellhuber et al. | |

FOREIGN PATENT DOCUMENTS

| | | |
|---|---|---|
| DE | 102011077970 A1 | 12/2012 |
| DE | 102015004121 A1 | 10/2016 |
| DE | 102018132736 A1 | 6/2020 |
| EP | 0399833 A1 | 11/1990 |
| EP | 0792683 A2 | 9/1997 |
| EP | 1043367 A1 | 10/2000 |
| EP | 1273552 A2 | 1/2003 |
| EP | 2805762 A1 | 11/2014 |
| EP | 3075704 A1 | 10/2016 |
| EP | 3153466 A1 | 4/2017 |
| EP | 3862076 A1 | 8/2021 |
| EP | 3900817 A1 | 10/2021 |
| EP | 4056892 A1 | 9/2022 |
| JP | S49010026 A | 1/1974 |
| JP | S5223246 A | 2/1977 |
| JP | S57144840 A | 9/1982 |
| JP | S6099951 A | 6/1985 |
| JP | S60191444 A | 9/1985 |
| JP | H05317843 A | 12/1993 |
| JP | H06104187 A | 4/1994 |
| JP | H1053775 A | 2/1998 |
| JP | H1094727 A | 4/1998 |
| JP | 2006261362 A | 9/2006 |
| JP | 2008221093 A | 9/2008 |
| JP | 2009526734 A | 7/2009 |
| JP | 2011258392 A | 12/2011 |
| JP | 2013067537 A | 4/2013 |
| JP | 2016087512 A | 5/2016 |
| PL | 175410 B1 | 5/1995 |
| RU | 2173213 C1 | 9/2001 |
| WO | 2004091773 A1 | 10/2004 |
| WO | 2015069762 A2 | 5/2015 |
| WO | 2015123578 A1 | 8/2015 |
| WO | 2015197181 A1 | 12/2015 |
| WO | 2017072057 A1 | 5/2017 |
| WO | 2019133215 A1 | 7/2019 |
| WO | 2019228798 A1 | 12/2019 |
| WO | 2020002326 A1 | 1/2020 |
| WO | 2020035575 A1 | 2/2020 |
| WO | 2022214622 A1 | 10/2022 |

OTHER PUBLICATIONS

Notice of Opposition received in Application No. EP21719925.6, dated Jul. 25, 2024.
Substantive examination report with English description, dated Aug. 15, 2024, 10 pages, issued in Saudi Arabia Application No. 523450274.
Waitz and Wubben "Resistance heated furnaces for protective gas and vacuum operation" from Heat Processing (9), Issue 1, 2011, p. 29-38.
Notice of Allowance issued Jun. 10, 2025 in corresponding Japanese Application No. JP20220555696, 1 page.

\* cited by examiner

REACTOR AND METHOD FOR CARRYING OUT A CHEMICAL REACTION

CROSS-REFERENCE TO RELATED APPLICATIONS

This application is the national phase of, and claims priority to, International Application No. PCT/EP2021/056207, now WO 2021/80856, filed Mar. 11, 2021, which claims priority to European Application No. 20163140.5, filed Mar. 13, 2020, the disclosure of each of which is incorporated by reference herein in its entirety.

FIELD OF THE INVENTION

The invention relates to a reactor and a method for carrying out a chemical reaction.

BACKGROUND

In a number of processes in the chemical industry, reactors are used in which one or more reactants are passed through heated reaction tubes and catalytically or non-catalytically reacted there. The heating serves in particular to overcome the activation energy required for the chemical reaction that is taking place. The reaction can proceed as a whole endothermically or, after overcoming the activation energy, exothermically. The claimed invention relates in particular to strongly endothermic reactions.

Examples of such processes are steam cracking, various reforming processes, in particular steam reforming, dry reforming (carbon dioxide reforming), mixed reforming processes, processes for dehydrogenating alkanes, and the like. During steam cracking, the reaction tubes are guided through the reactor in the form of coils, which can have at least one U-bend in the reactor, whereas tubes running through the reactor without a U-bend are typically used in steam reforming.

The invention is suitable for all such processes and designs of reaction tubes. The articles "Ethylene," "Gas production," and "Propene" in Ullmann's Encyclopedia of Industrial Chemistry, for example the publications dated Apr. 15, 2009, DOI: 10.1002/14356007.a10_045.pub2, dated Dec. 15, 2006, DOI: 10.1002/14356007.a12_169.pub2, and dated Jun. 15, 2000, DOI: 10.1002/14356007.a22_211, are referred to here for purely illustrative purposes.

The reaction tubes of corresponding reactors are conventionally heated using burners. In this case, the reaction tubes are routed through a combustion chamber in which the burners are also arranged.

However, as described, for example, in DE 10 2015 004 121 A1 (likewise EP 3 075 704 A1), the demand for synthesis gas and hydrogen which are produced with or without reduced local carbon dioxide emissions is, for example, currently increasing. However, this demand cannot be met by processes in which fired reactors are used due to the combustion of typically fossil energy carriers. Other processes are ruled out, for example, due to high costs. The same also applies to the provision of olefins and/or other hydrocarbons by steam cracking or the dehydrogenation of alkanes. In such cases, too, there is a desire for processes that at least on site emit lower amounts of carbon dioxide.

Against this background, the aforementioned DE 10 2015 004 121 A1 proposes an electrical heating of a reactor for steam reforming in addition to a firing. In this case, one or more voltage sources are used which provide a three-phase alternating voltage on three external conductors. Each external conductor is connected to a reaction tube. A star circuit is formed in which a star point is realized by a collector into which the pipelines open and to which the reaction tubes are conductively connected. In this way, the collector ideally remains potential-free. In relation to the vertical, the collector is arranged below and outside the combustion chamber and preferably extends transversely to the reactor tubes or along the horizontal. WO 2015/197181 A1 also discloses a reactor whose reaction tubes are arranged in a star-point circuit.

It is also conceivable in principle to carry out electrical heating of reactors by means of direct current or single-phase alternating current. In this case, no star circuit with a potential-free star point can be realized; however, in principle, the current feed can be realized in a similar manner. The claimed invention is suitable for both variants of electrical heating.

DE 23 62 628 A1 discloses a tube furnace for the thermal treatment of liquid or gaseous media in metal tubes, which can be heated by means of resistance heating, wherein the tubes to be heated by means of resistance heating are conductively connected to current supply lines via electrical connections at the ends of the sections to be heated.

US 2014/0238523 A1 relates to a device for heating a pipeline system for a molten salt, comprising at least two pipelines along which an electrical resistance heating element extends in each case, wherein each electrical resistance heating element has at least one end set at a potential close to ground potential and the electrical resistance heating element is remotely connected to a connection of a direct current source or in each case to a phase of an n-phase alternating current source.

In particular, the feed of current has proven to be challenging with such electrically heated reactors due to the high current flows and temperatures. Therefore, an object of the invention is to improve corresponding electrically heated reactors for carrying out chemical reactions.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

A reactor for carrying out a chemical reaction includes a reactor vessel comprising a first region and a second region; and one or more reaction tubes, wherein a number of tube sections of the one or more reaction tubes in each case run between the first region and the second region. For the electrical heating of the tube sections, the tube sections in the first region in each case are electrically connected to current connections (U, V, W) of a current source by means of flexible connection elements. Current feed arrangements are provided in the first region of the reactor, to which in each case one or in each case one group of the tube sections are electrically connected, and which each comprise one or more contact passages that in each case adjoins or adjoin at least one of the tube sections in the first region. A wall of the contact passages in each case is connected to a current feed element that has a rod-shaped section that runs at a wall passage through a wall of the reactor vessel. The rod-shaped sections of the current feed elements are in each case guided during operation in a longitudinally movable manner in their respective wall passages through the wall of the reactor vessel.

BRIEF DESCRIPTION OF THE DRAWINGS

FIGS. 5A to 5C illustrate reaction tubes and corresponding arrangements for use in a reactor according to an embodiment of the invention.

WRITTEN DESCRIPTION

Figure 1:
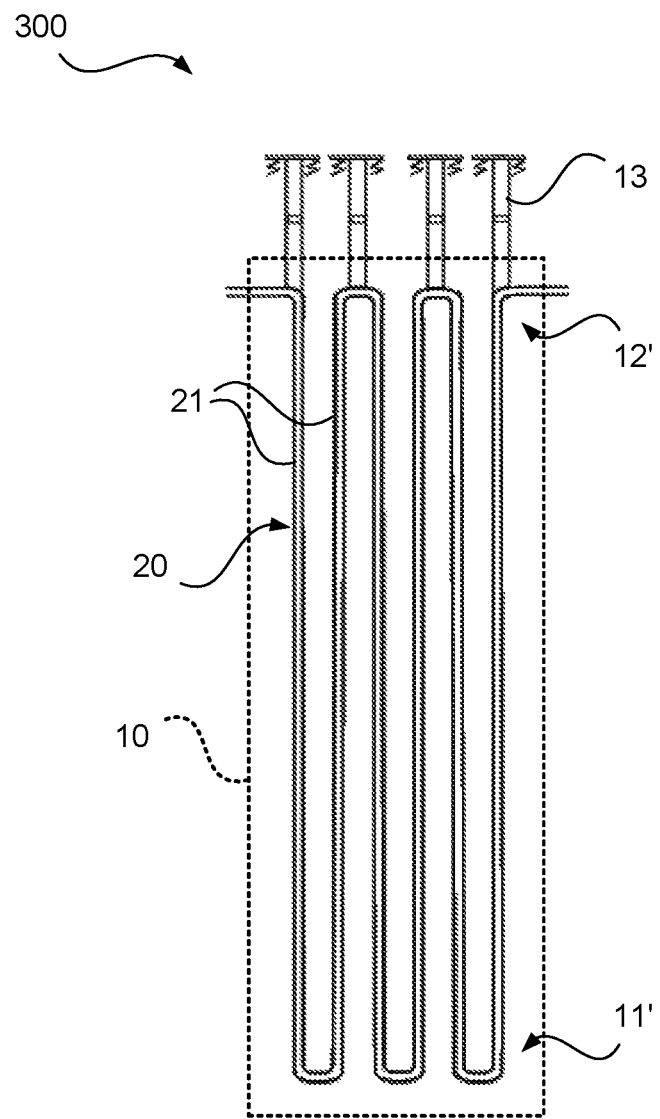
FIG. 1 schematically illustrates a reactor for carrying out a chemical reaction according to an embodiment not according to the invention and considered prior art.

Against this background, the invention proposes a reactor and a method for carrying out a chemical reaction.

In the at least partially electrified furnace concept (the term "furnace" is commonly understood to designate a corresponding reactor or at least its thermally insulated reaction space), which is the basis of the claimed invention, at least one of the reaction tubes or corresponding tube sections thereof (hereinafter also referred to for short as "tubes") is itself used as an electrical resistor in order to generate heat. This strategy has the advantage of a greater efficiency compared to indirect heating by external electric heating elements as well as a higher attainable heat flux density. The scope of the invention includes the possibility of also providing part of the total heat output used in the furnace through the combustion of chemical energy carriers.

If, therefore, electrical heating is mentioned here, it does not preclude the presence of additional non-electrical heating. In particular, it can also be provided that the contributions of electrical and non-electrical heating are varied over time, e.g., as a function of the supply and price of electricity or the supply and price of non-electrical energy carriers such as natural gas.

In the case of heating with polyphase alternating current, the current is fed into the directly heated reaction tubes via M separately connected phases. The current-conducting reaction tubes connected to the M phases are advantageously also electrically connected to a star point. The number of phases M is in particular 3, corresponding to the number of phases of conventional three-phase current sources or three-phase current networks. In principle, however, the invention is not restricted to the use of three phases but can also be used with a larger number of phases, e.g., a number of phases of 4, 5, 6, 7, or 8. Thereby, a phase offset amounts to in particular 360°/M, i.e., 120° for a three-phase current.

In an electrical heating system with polyphase alternating current, potential equalization between the phases is achieved by the star circuit at the star point, which makes electrical insulation of the connected pipelines superfluous. This represents a particular advantage of such a furnace concept, since a break in the metallic reaction tubes for insulating certain sections is undesirable, in particular because of the high temperatures used and the high material and construction outlay thus required.

However, the measures proposed in accordance with the invention, which are explained below, are suitable in the same way for the use of direct current, and the invention can be used in reactors heated by both alternating current and direct current or also in corresponding mixed forms. In the case of a direct current arrangement, only the type of the current source and the region of the reaction tubes opposite to the current feed or corresponding sections acted upon by current are different from an alternating current arrangement. In the latter, an electrical connection of different tube sections is carried out only optionally. Since there is no potential-free star point in a direct current arrangement, suitable current discharge elements, which safely return the current flow to the outside again, are to be provided. The same applies in principle also to single-phase alternating current, which can also be used.

In the language of the claims, the invention relates to a reactor for carrying out a chemical reaction, which reactor comprises a reactor vessel (i.e., a thermally insulated or at least partially insulated region) and one or more reaction tubes, wherein a number of tube sections of the one or more reaction tubes in each case run between a first region and a second region within the reactor vessel and through an intermediate region between the first and second regions, and wherein for the electrical heating of the tube sections, the tube sections in the first region in each case are or can be electrically connected to one or more current connections, and in the case of a direct current arrangement to one or more direct current connections, and in the case of a single-phase or polyphase alternating current arrangement to the phase connection or connections ("external conductors") of the alternating current source, as explained in detail below.

The first region can in particular lie on a first terminal end of the straight tube sections and the second region on a second terminal end, which is opposite the first terminal end. In particular, the first region can lie in an upper and the second region in a lower region of the reactor or vice versa. In other words, the first region and the second region lie in particular at opposite ends of the reactor vessel or its interior, wherein the interior of the reactor vessel between the first and the second region corresponds in particular to the intermediate region. The first region can, for example, represent or comprise the terminal 5%, 10% or 20% of the interior at one end of the reactor vessel, whereas the second region can represent or comprise the terminal 5%, 10% or 20% at the other, opposite end of the interior of the reactor vessel. In particular, during the operation of the reactor, the first region is arranged at the bottom and the second region is located at the top.

As mentioned, in a polyphase alternating current arrangement, an alternating voltage is in each case provided via the phase connections and the alternating voltages of the phase connections are phase-shifted in the manner explained above. Within the scope of the invention, for example, a supply network or a suitable generator and/or transformer can serve as a polyphase alternating current source. In this arrangement, the tube sections form in particular a star circuit in which they are electrically conductively coupled to one another at their respective end that lies opposite the current feed, i.e., in the second region.

However, in the case of a direct current arrangement, the same or different static electrical potentials are fed via the direct current connections, and current extraction elements or current discharge elements are provided in particular in each case at the end opposite the current feed. The terms "feed" and "extraction" may refer to the physical or technical current direction. A single-phase alternating current source is used in a comparable manner.

In the intermediate region, the tube sections run through the reactor vessel in particular freely, i.e., without mechanical support, without electrical contacting, and/or without fluidic or purely mechanical cross-connections to one another. They in particular run substantially or entirely straight in the intermediate region, wherein "substantially straight" is to be understood as meaning that an angular deviation of less than 10° or 5° is present.

In particular, the cracking reactions in steam cracking are strongly endothermic reactions. Therefore, for the provision of the necessary energy for the reaction by means of direct heating (ohmic resistance), high current intensities, which are provided in the aforementioned reactor concept by one or more transformers placed outside the reactor, are required.

The electrical current must be conducted from the outside into the interior of the thermally insulated reactor and to the process-carrying regions with the lowest possible losses (low electrical resistance). In the latter, the endothermic reaction together with the very rapidly flowing process medium on the tube inner side (high heat transfer) leads to the very effective cooling of the reactor tubes or to a very high heat flux density on the tube inner side. The desired direct heat transfer from the at least partially electrically heated tube material to the process gas is thus achieved in the process-carrying tubes.

A particular problem relates to the above-mentioned low-loss supply of the high current to the process-carrying tubes. Such supply must necessarily be effected, provided that a current is to be fed into the tubes within the reactor, via conductors that cannot be cooled by direct convective heat transfer to a cooler process gas, as will also be explained below. Here, there must not be an unacceptable increase in temperature in the less efficiently cooled regions. Moreover, a steep temperature rise of up to 900 K (max. temperature difference between the environment and the reactor) within short path lengths (in part less than 1 meter) must also be overcome via such supply.

To reduce the thermal losses and thus to achieve a high system efficiency, it is imperative to place the electrically directly heated reactor tubes in an insulated box (referred to here as the reactor vessel). During the penetration of the thermally insulated wall of the reactor vessel, the current conductor must overcome a quasi-adiabatic zone without impermissibly high local temperatures occurring in such regions.

According to the invention, in order to achieve such objective in the first region of the reactor, that is, in the region of the current feed, current feed arrangements are provided, to each of which a tube section or a group of the tube sections is electrically connected. The tube sections are provided in such a number that in each case one or in each case one group of a plurality of tube sections can in each case be connected to one of the current feed arrangements and vice versa. The number of current feed arrangements is based on the number of phase connections of the polyphase alternating current source in the case of an alternating current arrangement, or such number corresponds to the number of direct current connections. When an alternating current arrangement is used, it can be the same as the number of phase connections or can be an integer multiple thereof In the latter case, for example, two of the current feed arrangements can in each case be connected to one of the phase connections of the alternating current source, etc.

The current feed arrangements each comprise one or more contact passages, which adjoins or adjoin at least one of the tube sections in the first region, and which run through the current feed arrangements. The one or more contact passages in the current feed arrangements can, as described in more detail below, run straight or in the form of a U-bend through the current feed arrangements. They are then in particular formed as a wall-reinforced bend. Reaction tubes without U-bends are in particular wall-reinforced sleeves.

Within the scope of the invention, the one or more contact passages in the current feed arrangements can either be formed in one or more components that are attached and firmly bonded to the tube sections in a high-temperature-resistant manner, or alternatively in the form of, in each case, a section or a continuous section of the reaction tubes. In all embodiments, a design with as few components as possible is typically found to be advantageous, as also explained below.

In the former case, the tube sections that run between the first and the second region in the reactor can be welded to a prefabricated component in which one or more of the contact passages runs or run, or a corresponding additional component can be cast onto the tube sections that run between the first and the second region in the reactor. In the latter case, continuous tubes that, on the one hand, run between the first and second regions in the reactor and, on the other hand, are to form the contact passages in the respective current feed arrangements, can be provided, and additional components of the current feed arrangements can be provided by means of casting or recasting or welding.

It is understood that, where hereinabove and hereinafter reference is made to the fact that the current feed arrangements include one or more contact passages "that in each case adjoins or adjoin at least one of the tube sections in the first region," this means that the contact passages in the current feed arrangements form with the respective tube sections between the first and second regions a continuous channel for the process fluid to pass through the tube sections.

In particular, a tube interior of the respective tube sections between the first and the second regions continues in the corresponding contact passages, in particular without a significant tapering or widening, wherein a "significant" tapering or widening is intended to designate a tapering or widening by more than 10% of the cross-sectional area. The term "contact passages" is used to express that these are regions in which there is a conductive connection via metallic components to a current connection, even if, in certain embodiments of the invention, the "contact passages" are continuous continuations of the tube sections in the first region.

The term "firmly bonded in a high-temperature-resistant manner" is intended to designate a type of connection by means of which two or more metallic parts are firmly bonded to one another and the connection is permanent at 500° C. to 1,500° C., in particular 600° C. to 1,200° C. or 800° C. to 1,000° C., i.e., does not become detached at such temperatures during regular operation. A high-temperature-resistant firmly bonded connection can in particular be formed as a metal-to-metal connection, which is designed such that no nonmetallic material remains between the connected parts. Such a connection can be produced in particular by welding, casting or recasting. It can also be a connection where no structural difference can be observed at the transition of the connected parts and in particular a connection where no additional metal is used for the connection.

According to the invention, a wall of the contact passages of each current feed arrangement is connected in each case to a current feed element that has at least one rod-shaped section, which in each case runs at a wall passage through a wall of the reactor vessel. The "wall" of the reactor vessel can also be an intermediate wall to a separate space in which the rod-shaped sections are contacted, and which in turn is delimited by means of a further wall or a plurality of walls. The rod-shaped section is, for example, in contrast to strands or the like, in particular in one piece (i.e., in particular not in the form of parallel or intertwined wires) made of a current-conducting material such as metal. It can be formed to be solid or at least partially tubular, i.e., as a hollow rod. The rod-shaped section has a longitudinal extension perpendicular to the wall of the reactor vessel, which is at least twice as large, in particular at least three times, four times or five times, and, for example, up to ten times as large as the largest transverse extension parallel to the wall of the reactor vessel. The rod-shaped section can be formed to be, for example, round, oval, triangular or polygonal in cross-section, or can have any other shape.

The current feed elements of the current feed arrangements can be attached with their rod-shaped sections directly to the wall of the contact passages or can transition into them by a single-piece fabrication. However, one or more intermediate elements can also be provided, which then in each case form a part of the current feed elements.

According to the invention, the introduction of current into the reaction tubes or the tube sections thereof to be heated thus takes place via the rod-shaped section, which is preferably attached to the process-carrying tube in vertical direction to the local process gas flow, i.e., in particular at the apex of a U-bend or vertical to the course of the tube in the case of non-curved tubes. Here, in particular a globally decreasing free conductor cross-section from the outside to the reaction zone can be present in a rod-shaped section with a homogeneous material composition. This relates to both the rod-shaped section and the transition region to the reaction tube or the contact passage, which preferably has an enlarged wall thickness in comparison with the reaction tube away from the feed.

A particularly advantageous embodiment of the invention comprises that, for any two cross-sectional areas S1, S2 representing insulating surfaces through the current feed element, via which the temporal root mean square (rms) value of the electric potential Vrms,i is constant in each case, and which are arranged at different distances from the alternating voltage source, i.e., in particular a transformer, the temporal root mean square potential Vrms,1 of the cross-sectional area S1 located closer to the transformer is always higher than the temporal root mean square potential Vrms,2 of the cross-sectional area S2 located further away from the transformer, so that Vrms,1>Vrms,2 applies. The terms "closer" and "further" refer here to shorter or longer flow paths of the electrical current from the current source to the respective cross-sectional area. The use of rms values for the potentials refers to the reactor operation with alternating current. In the case of direct current operation, the described relationships apply to arithmetically averaged values of the electrical potential.

The entire current feed (i.e., the entire feed element with the contact passage) is further advantageously designed in such a way that, for the explained two arbitrary cross-sectional areas S1 and S2 at different distances from the current source and with Vrms,1>Vrms,2, the quotient A2/A1 of the surface area A2 of the cross-sectional area S2 located further away from the current source and of the surface content A1 of the cross-sectional area S1 located closer to the current source is up to 0.5, in particular up to 0.9, up to 1 up to 1.1 or up to 2. In a particularly preferred embodiment, the quotient A2/A1 of the surface areas of any such pairs of areas is up to 1.

For example, for manufacturing reasons, deviations from this preferred embodiment can occur, so that even small cross-sectional increases can be accepted locally. For two cross-sectional areas S1* and S2* with global extreme values of their respective surface areas A1*=A max and A2*=A min, the relationship is however advantageously always Vrms,1*>Vrms,2*, i.e., the area with the highest cross-section is closer to the current source than the area with the smallest cross-section.

In the manner explained, an optimally continuous increase in the material temperature can be ensured, wherein the maximum is particularly preferably reached only in the reaction zone. According to a particularly advantageous embodiment of the invention, as a specification with regard to the temperature distribution, it can be specified, analogously to the area distributions, that for the explained two arbitrary cross-sectional areas S1 and S2 at different distances from the current source and with Vrms,1>Vrms,2, the temperature difference T1−T2 of the temperature T1 of the cross-sectional area S1 located closer to the current source and the temperature T2 of the cross-sectional area S2 located further away from the current source is up to −100 K, in particular up to −10 K, up to −1 K, up to 0 K, up to 1 K, up to 10 K or up to 100 K. In a particularly preferred embodiment, the temperature difference T1−T2 of all such pairs of areas is less than 0 K.

This specification includes, among other things, the condition that, in the entire region of the current feed, a maximum local temperature increase of −100 K, −10 K, −1 K, 0 K, 1 K, 10 K or 100 K occurs in relation to the maximum material temperature occurring in the adjacent tube section.

The temperature difference T1*−T2* of the temperatures T1* and T2* of the cross-sectional areas S1* and S2* with the global extreme values of the surface areas A1*=A max and A2*=A min in the current feed element is further advantageously up to −500 K, up to −200 K, up to −100 K, up to 0 K or up to 100 K, i.e., the area with the highest cross-section according to this embodiment of the invention must be located closer to the transformer and is preferably cooler or at most slightly hotter than the area with the smallest cross-section.

The current feed element is advantageously formed, from the direction of the current source to the tube sections, initially as a solid material rod and leads to the contact passage located closer to the tube sections, which can in particular be formed as a thick-walled bend or sheath, up to the relatively thin-walled reactor tubes or the tube sections to be heated.

In one embodiment of the invention, the free conductor cross-section advantageously decreases predominantly continuously or monotonically. Since, with identical or similar materials provided in this embodiment, the electrical resistance depends only on the available conductor area, the specific amount of energy released also increases steadily in this way. This results in the highest possible utilization of the supplied energy, since only the amount of heat absorbed by the process gas can be effectively used in the reaction tubes.

According to a particularly advantageous embodiment of the invention, the exact course of the conductor cross-section is moreover adapted to the local temperature and heat transfer conditions. For example, in the region of quasi-adiabatic wall passages through the wall of the reactor vessel (in which no significant heat dissipation is possible through the insulating reactor wall), large cross-sections, which reduce the local heat dissipation in such regions to a minimum, are preferably used, so that the local increase in temperature can be limited upward. In other words, the rod-shaped section of the current feed element advantageously has a larger cross-sectional area in the region of the wall passage than in at least one remaining region. Since, as mentioned below, the rod-shaped section is guided displaceably in the wall passage, the region of the rod-shaped section "in the region of the wall passage" is to be understood to mean at least one such region that is located in the wall passage at maximum thermal expansion of the tube sections.

As will also be explained below, for avoiding contact resistances, at least the rod-shaped section the current feed element and the contact section are particularly preferably made of a one-piece component, e.g. in the form of a standing cast part. In the case of a multi-part construction, which is alternatively likewise possible, it is advantageously ensured by means of suitable joining methods (e.g., friction welding) that the explained specifications relating to the conductor cross-section and the maximum local temperature increase are maintained even in the region of the joint connection.

Particularly advantageously, the current feed elements each have a free conductor cross-section that, between the respective wall passage of the current feed elements and a point of the wall of the one or more contact passages that is closest to the wall passage and is electrically contacted by the respective current feed elements, is at no point less than 10 square centimeters, advantageously at no point less than 30 square centimeters and in particular at no point less than 50 square centimeters. By using correspondingly high conductor cross-sections, a particularly good current transfer without resistance losses can be ensured.

Here, a free conductor cross-section is intended to designate the proportion of the cross-section of a conductor that is formed to be current-conducting. For example, in the case of a tubular conductor or a conductor provided with a groove or cavity, the tube interior or the region of the groove or cavity does not count as the free conductor cross-section. By contrast, in the case of a solid conductor made of a current-conducting material, the cross-section corresponds to the conductor cross-section and the free conductor cross-section.

According to the invention, the rod-shaped sections of the current feed elements are in each case guided in a longitudinally movable manner in their wall passages through the wall of the reactor vessel. A freedom of movement ensured in this way is particularly advantageous for the mechanical behavior of the reaction tubes, which is dominated primarily by the thermal expansion of the tubes by several decimeters during operation of the reactor. Due to the freedom of movement, the bending load on the reaction tubes that would occur in case of a rigid fastening is reduced. On the other hand, as also mentioned below, the reaction tubes can be fastened in the second region to a rigid star bridge on the reactor roof, so that in this way a stable suspension is provided even in the case of a corresponding longitudinal mobility of the rod-shaped sections of the current feed elements. Due to their advantageous dimensioning with a sufficiently high conductor cross-section, the rod-shaped sections of the current feed elements ensure a secure lateral guidance of the reaction tubes.

Since the reactions carried out in the reactor according to the invention require high temperatures, the electrical connection in the first region must be implemented in a high-temperature range of, for example, approximately 900° C. for steam cracking. This is possible by the measures proposed according to the invention by the selection of suitable materials and their adequate dimensioning. At the same time, the connection is intended to have a high electrical conductivity and high mechanical stability and reliability at high temperatures. Failure of the electrical connection leads to asymmetrical potentials at the star point and consequently to an instantaneous safety-related shutdown of the system due to undesired current flow in system parts. The invention provides advantages over the prior art by avoiding such situations.

The contacting of the tube sections within the reactor vessel provided according to the invention, compared to a theoretically likewise possible contacting outside the reactor vessel, for which the reaction tubes would have to be led out of the reactor vessel, has the advantage of a clear defined section of the electrical heat input, because in this case no electrically heated tube sections have to be guided from the warmer interior to the colder exterior. Due to the contacting according to the invention, external thermal boundary conditions that are highly homogeneous in terms of space of the electrically heated tube sections can be achieved due to the tube sections arranged completely within the reactor vessel. This results in process engineering advantages, for example, an expected excessive coke formation in heated and externally thermally insulated passages can be avoided.

Outside the reactor vessel, the rod-shaped sections of the current feed elements can be electrically connected to a transformer system, for example, by means of connection elements such as busbars and connection bands. The connection bands and busbars can be made of a different material. Such connection elements are formed to be flexible, since lower temperatures are present outside the reactor vessel. Switching devices can be installed in particular on a primary side of the transformer system since there is a higher voltage and a lower current there.

Within the scope of the invention, the current feed elements, the contact passages and the tube sections may be formed from the same material or from materials whose electrical conductivities (in the sense of a material constant, as is customary in the field) differ from one another by no more than 50%, no more than 30%, no more than 10%, or are advantageously the same. For example, the components mentioned can also be formed from steels of the same steel class. The use of the same or closely related materials can facilitate casting or welding.

In a preferred embodiment, the current feed elements, the contact passages and the tube sections have a heat-resistant chromium-nickel-steel alloy with high oxidation or scaling resistance and high carburization resistance, or are formed from such.

For example, it can be a ferrous material with 0.1 to 0.5 wt % carbon, 20 to 50 wt % chromium, 20 to 80 wt % nickel, 0 to 2 wt % niobium, 0 to 3 wt % silicon, 0 to 5% tungsten and 0 to 1 wt % other components, wherein the constituents complement each other to form the non-ferrous fraction.

For example, materials with the standard designations GX40CrNiSi25-20, GX40NiCrSiNb35-25, GX45NiCrSiNbTi35-25, GX35CrNi SiNb24-24, GX45NiCrSi35-25, GX43NiCrWSi35-25-4, GX10NiCrNb32-20, GX50CrNiSi30-30, G-NiCr28W, G-NiCrCoW, GX45NiCrSiNb45-35, GX13NiCrNb45-35, GX13NiCrNb37-25, or GX55NiCrWZr33-30-04, according to DIN EN 10027 Part 1, "Materials", may be used. These have proven to be particularly suitable for high-temperature use.

In all of the cases explained above, the connecting element and the tube sections can be formed from the same material or from materials whose electrical conductivities (in the sense of a material constant, as is customary in the field) differ by no more than 50%, no more than 30%, no more than 10%, or are advantageously the same. For example, the connecting element and the tube sections can also be formed from steels of the same steel class. The use of identical or closely related materials can facilitate the one-piece design of the connecting element and of the tube sections, for example by means of casting or welding.

In the second region, all tube sections within the reactor vessel can be electrically conductively connected to each other by means of a rigid connecting element ("star bridge") when heated by means of polyphase alternating current, or such connection can take place in groups by means of a plurality of rigid connecting elements.

The electrically conductive connection is made in this case, i.e., in the case of heating by means of polyphase alternating current, in such a way that at least extensive potential equalization of the phases connected in the first region arises, as explained. The one or more connecting elements couple the connected tube sections, in particular, in a non-fluid-collecting and non-fluid-distributing manner, in contrast to a collector known from the prior art and arranged outside the reactor. The potential equalization within the reactor vessel proposed in the embodiment of the invention just explained has the advantage of an almost complete absence of potential or a significantly reduced return of current via a neutral conductor. The result is minimal current dissipation via the header connections to other parts of the process system and a high level of shock protection. In this connection as well, the advantage of the external thermal boundary conditions that are highly homogeneous in terms of space applies in contrast to a guidance of the reaction tubes outside the reactor vessel through the wall of the reactor vessel, that is required for potential equalization, the process-related advantages already explained above.

The corresponding realization of a star circuit in combination with the explained current feed via longitudinally guided current feed elements as a whole creates a design that enables efficient energization with simultaneous stable fastening, which withstands the stresses resulting primarily from the high thermal expansion rates.

This likewise applies to the heating that is also possible according to the invention by means of direct current or single-phase alternating current, wherein, in this case, no star point is present in the reactor, as mentioned. Nevertheless, a rigid arrangement can also be provided here at the end opposite the current feed, since the reaction tubes can expand substantially freely due to the current feed elements provided according to the invention, without the generation of stresses. Thus, a rigid arrangement can be provided at the end of the reaction tubes opposite the current feed, but, if necessary, elements that correspond to the current feed elements according to the invention can also be provided here. In any case, however, a movable arrangement can be dispensed with.

The invention will be described below first with reference to reaction tubes and reactors as used for steam cracking. However, as explained afterwards, the invention can also be used in other types of reactors, as addressed subsequently. In general, as mentioned, the reactor proposed according to the invention can be used for carrying out any endothermic chemical reaction.

Reaction tubes, as are typically used for steam cracking, typically have at least one U-bend. For example, these can be so-called 2-passage coils. These have two tube sections in the reactor vessel, which pass into one another via (exactly) one U-bend and therefore basically have the shape of an (elongated) U. The sections entering and exiting the reactor vessel, which in particular pass seamlessly or without a flow-relevant transition into the heated tube sections, are here referred to (also with reference to the reaction tubes described below) as "feed section" and "extraction section". There is always a plurality of such reaction tubes present.

In this embodiment, the reactor can therefore be formed in such a way that the tube sections in each case comprise two tube sections of a plurality of reaction tubes which are arranged at least partially side by side in the reactor vessel, the two tube sections of the plurality of reaction tubes in each case passing into each other in the first region in each case via a U-bend. In particular, as mentioned, one of the in each case two tube sections in the second region is connected to a feed section and the others of the in each case two tube sections in the second region are connected to an extraction section.

In this case, the one or more contact passages in the current feed arrangements can comprise or represent the U-bends. Since a plurality of reaction tubes with U-bends is present, a plurality of U-bends can also be provided in each of the respective current feed arrangements if there is a corresponding number of them, and in this way can be connected to a current connection. In this way, the mechanical fastening can be improved and the number of components can be reduced. Alternatively, however, it is also possible to provide one current feed arrangement per U-bend in each case even when a plurality of U-bends is energized via a current connection, for example in order to ensure an individual longitudinal mobility of the current feed elements with a thermal expansion that may differ.

The embodiment of the invention just explained can also be applied to cases in which reaction tubes having two feed sections and one extraction section are used. With such reaction tubes, the two feed sections are each connected to one tube section. The extraction section is also connected to a tube section. The tube sections connected to the feed sections pass into the tube section connected to the extraction section in a typically Y-shaped connection region. Both the tube sections connected to the feed sections and the tube section connected to the extraction section can each have one or more U-bends or none at all.

Figure 7A:
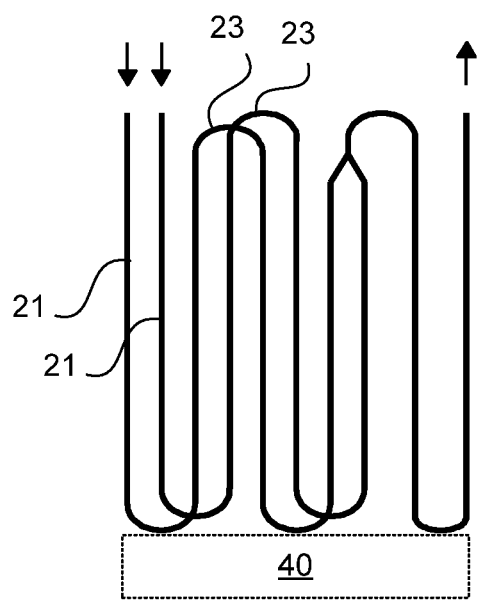
FIGS. 7A to 7C illustrate further reaction tubes for use in a reactor according to an embodiment of the invention.
Figure 7B:
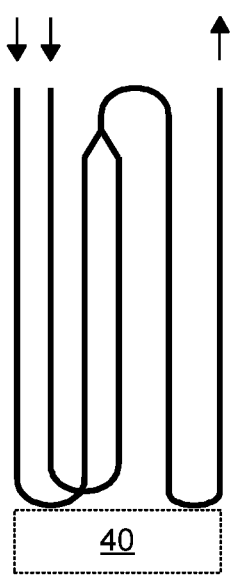
Figure 7C:
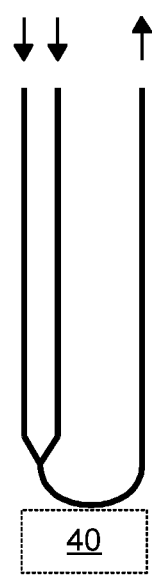

For example, reaction tubes as illustrated in FIG. 7C can be used. In these, the tube sections connected to the feed sections have no U-bend, whereas the tube section connected to the extraction section has a U-bend.

However, reaction tubes as illustrated in FIG. 7B may also be used. In these, the tube sections connected to the feed sections each have one U-bend and the tube section connected to the extraction section has two U-bends.

Even the use of reaction tubes as illustrated in FIG. 7A is possible. In these, the tube sections connected to the feed sections each have three U-bends and the tube section connected to the extraction section has two U-bends.

In addition to the embodiment described above with reference to 2-passage coils, however, an embodiment suitable for use with so-called 4-passage coils can also be used. They have four essentially straight tube sections. However, arrangements with a higher, even number of straight tube sections are also possible.

In more general terms, a correspondingly designed reactor comprises one or more reaction tubes, each of which has an even number of four or more tube sections connected in series with one another via a number of U-bends, the number of U-bends being one less than the number of tube sections connected in series with one another via the U-bends, and wherein the U-bends are arranged alternately in the first and the second regions starting with a first U-bend in the first region.

A "U-bend" is understood here in particular to mean a tube section or tube component that comprises a part-circular or part-elliptical, in particular a semicircular or semi-elliptical tube bend. The beginning and end have cut surfaces lying next to one another in particular in one plane.

Each of the U-bends, provided it is located in the first region within the reactor vessel and is to be energized accordingly, can be designed in the form of a contact passage in a current feed arrangement according to the invention or represent a part of such a contact passage.

As mentioned, a corresponding reactor can be designed in particular as a reactor for steam cracking, that is in particular by the choice of correspond temperature-resistant materials and the geometric configuration of the reaction tubes.

Reaction tubes, as are typically used for steam reforming, typically have no U-bends within the reactor vessel. In this case, the tube sections can each comprise a tube section consisting of a plurality of reaction tubes, wherein the tube sections within the reactor vessel are arranged in a fluidically unconnected manner and at least partially side by side and in each case are connected to a feed section for fluid in the first region and an extraction section for fluid in the second region. The feed and extraction sections for fluid extend in particular in the same direction as the tube sections or do not cause a fluid flow that is deflected by more than 15° in relation to the fluid flow in the tube sections connected thereto. The feed sections and extraction sections are in particular likewise formed integrally with these, i.e., in particular in the form of the same tube. The reaction tubes may, in particular, also be equipped with a suitable catalyst for steam reforming.

In this embodiment, the contact passages in a current feed arrangement according to the invention represent straight tube sections or channels. Here, the current feed element can be attached to the reaction tubes in the second region in particular in the manner of a sleeve.

In all cases, by forming the current feed elements and the contact passages, and optionally also the tube sections, from as few individual parts as possible, the number of metal-to-metal connections (e.g., welded or soldered connections) can be reduced or even completely dispensed with. Mechanical stability and reliability can thereby be increased. In a particularly advantageous embodiment, the current feed elements and the contact passages can each be implemented as a single casting, or, as mentioned, parts of the process-carrying tubes can be recast and/or parts of the process-carrying tubes can be formed as an integral part of a corresponding casting.

Metal-to-metal connections or metal transitions, which can be reduced within the scope of the invention, could lead to a local change in electrical resistance, and therefore to hot spots. Hot spots in turn lead to a reduction in service life due to elevated local temperatures or to mechanical stress peaks due to steep local temperature gradients. This is avoided within the scope of the invention.

A one-piece design of as many components as possible brings mechanical stability, reliability and a reduction of individual components. A high degree of mechanical stability is desirable, since failure, as mentioned, can lead to safety-critical situations. By means of the described embodiment in the sense of the invention, the principle of reaction tubes resistively heated with polyphase alternating current in a star circuit is technically realizable in the high-temperature range, i.e., in particular at more than 500° C., more than 600° C., more than 700° C. or more than 800° C.

The invention also relates to a method for performing a chemical reaction using a reactor having a reactor vessel and one or more reaction tubes, wherein a number of tube sections of the one or more reaction tubes in each case run between a first region and a second region in the reactor vessel, and wherein the first regions for heating the tube sections are each electrically connected to one or more current connections of a current source.

According to the invention, a reactor is used, which has current feed arrangements in the first region to which in each case one or in each case one group of the tube sections is electrically connected, wherein the current feed arrangements each comprise one or more contact passages that in each case adjoins or adjoin at least one of the tube sections in the first region, and wherein a wall of the contact passages in each case is connected to a current feed element that has at least one rod-shaped section, which in each case runs at a wall passage through a wall of the reactor vessel.

For further features and advantages of a corresponding method, in which a reactor according to one of the previously explained embodiments of the invention is advantageously used, reference is made to the above explanations.

The invention will be further explained below with reference to the accompanying drawings, which illustrate embodiments of the invention with reference to, and in comparison with, the prior art.

In the description of the figures, elements that correspond to one another functionally or structurally are indicated by identical reference symbols and for the sake of clarity are not repeatedly explained. If components of devices are explained below, the corresponding explanations will in each case also relate to the methods carried out therewith and vice versa. The description of the figures repeatedly refers to an alternating current heating. As mentioned, however, the invention is also suitable in the same way for the use of direct current for heating. Reference is made here to the above explanations.

FIG. 1 schematically illustrates a reactor for carrying out a chemical reaction according to an embodiment not according to the invention and considered prior art.

Figure 2:
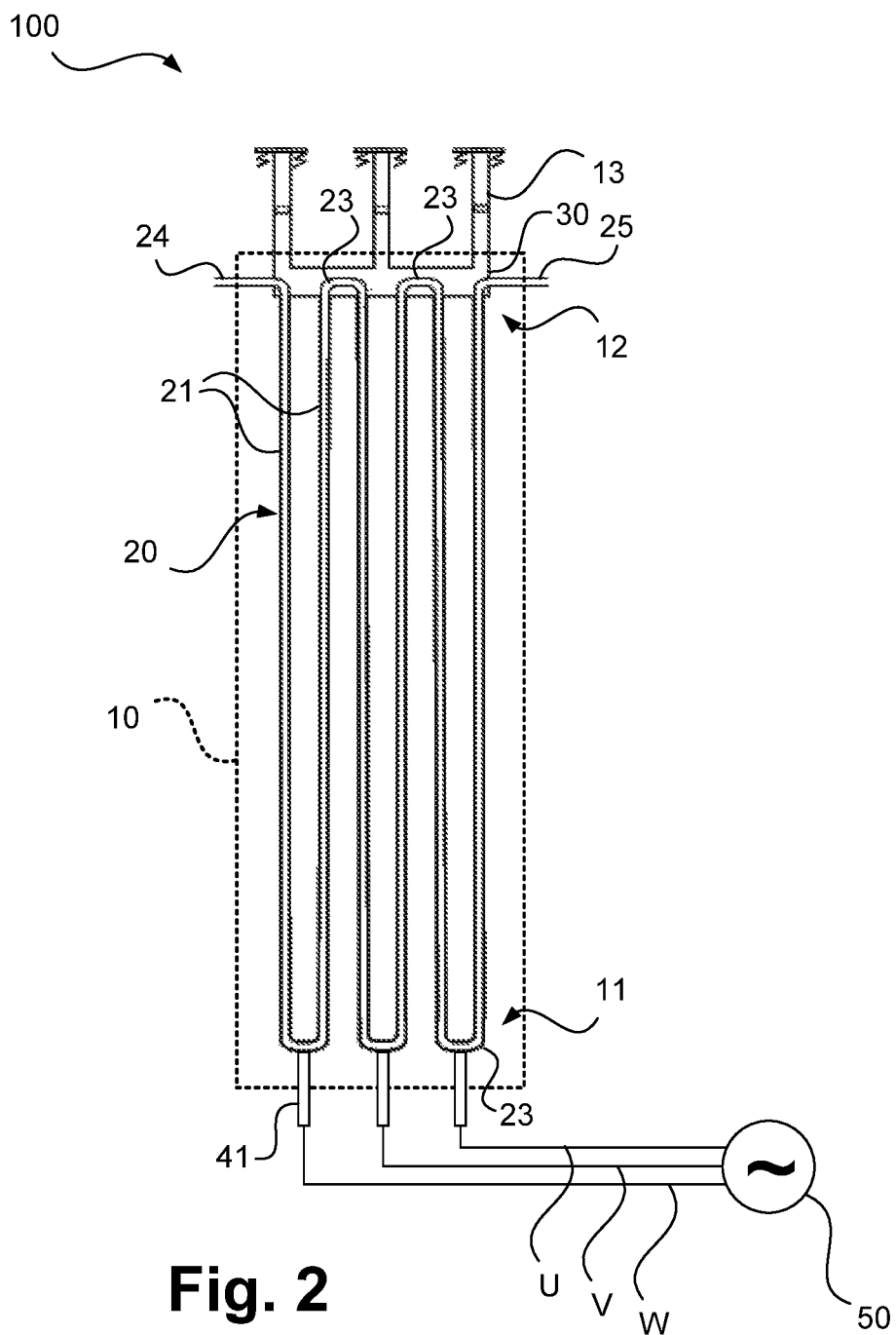
FIG. 2 schematically illustrates a reactor for carrying out a chemical reaction according to an embodiment of the invention.

The reactor here designated by 300 is set up to carry out a chemical reaction. For this purpose, it has in particular a thermally insulated reactor vessel 10 and a reaction tube 20, wherein a number of tube sections of the reaction tube 20, which are designated here by 21 only in two cases, run respectively between a first zone 11' and a second zone 12' in the reactor vessel 10. The reaction tube 20, which will be explained in more detail below with reference to FIG. 2, is attached to a ceiling of the reactor vessel or to a support structure by means of suitable suspensions 13. In a lower region, the reactor vessel can in particular have a furnace (not illustrated). It goes without saying that a plurality of reaction tubes can be provided in each case here and subsequently.

FIG. 2 schematically illustrates a reactor for carrying out a chemical reaction according to an embodiment of the invention, which is overall designated by 100.

The zones previously designated by 11' and 12' here take the form of regions 11 and 12, wherein the tube sections 21 for heating the tube sections 21 in the first regions 11 can each be electrically connected to the phase connections U, V, W) of a polyphase alternating current source 50. Switches and the like as well as the specific type of connection are not illustrated.

In the embodiment of the invention illustrated here, the tube sections 21 are electrically conductively connected to one another in the second regions 12 by means of a connecting element 30 which is integrally connected to the one or more reaction tubes 20 and is arranged within the reactor vessel 10. A neutral conductor can also be connected thereto.

In the reactor 100 illustrated here, a plurality of tube sections 21 of a reaction tube 20 (although a plurality of such reaction tubes 20 may be provided) are thus arranged side by side in the reactor vessel 10. The tube sections 21 pass into one another via U-bends 23 (only partially designated) and are connected to a feed section 24 and an extraction section 25.

A first group of the U-bends 23 (at the bottom in the drawing) is arranged side by side in the first region 11 and a second group of the U-bends 23 (at the top in the drawing) is arranged side by side in the second region 12. The U-bends 23 of the second group are formed in the connecting element 30, and the tube sections 21 extend from the connecting element 30 in the second region 12 to the first region 11.

Within the scope of the invention, the use of the connecting element 30 is optional but advantageous. However, embodiments of the invention, which are explained below, relate in particular to the embodiment of the means for feeding current in the first region 11. This is carried out by the use of current feed elements 41, which are illustrated here in a highly simplified manner and of which only one is designated.

Figure 3:
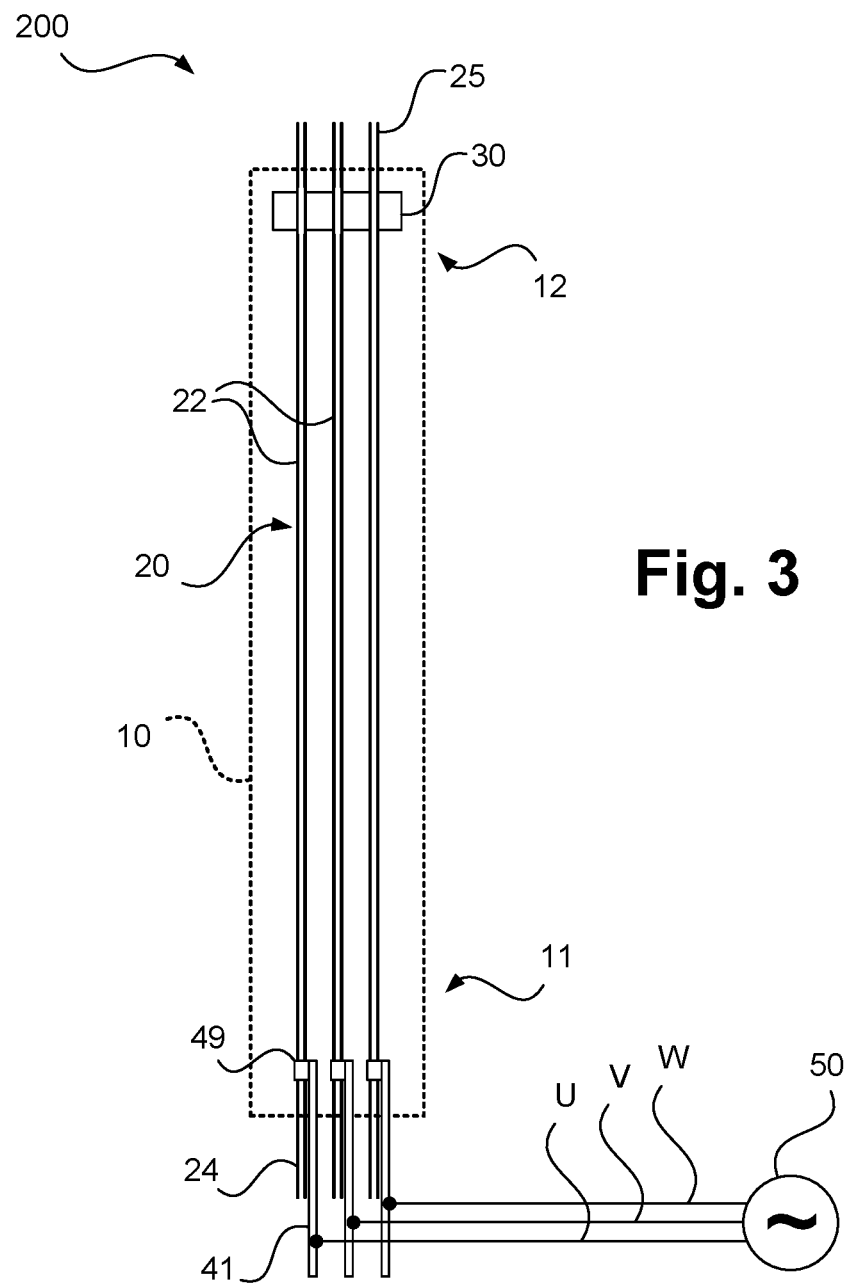
FIG. 3 schematically illustrates a reactor for carrying out a chemical reaction according to a further embodiment of the invention.

FIG. 3 schematically illustrates a reactor for carrying out a chemical reaction according to an embodiment of the invention, which is overall designated by 200.

In the reactor 200, the tube sections—here in contrast designated by 22—each comprise a tube section 22 consisting of a plurality of reaction tubes 20, wherein the tube sections 22 are arranged side by side in the reactor vessel 10 in a fluidically unconnected manner and are each connected to feed sections 24 and extraction sections 25. For the remaining elements, reference is expressly made to the above explanations relating to the preceding figures.

In turn, within the scope of the invention, the use of a connecting element 30 is optional but advantageous. Here as well, current feed elements 41 are illustrated in a highly simplified manner. They can have a sleeve-like region 49, which is placed in the first region 11 around the reaction tubes 20 or the tube sections.

Figure 4:
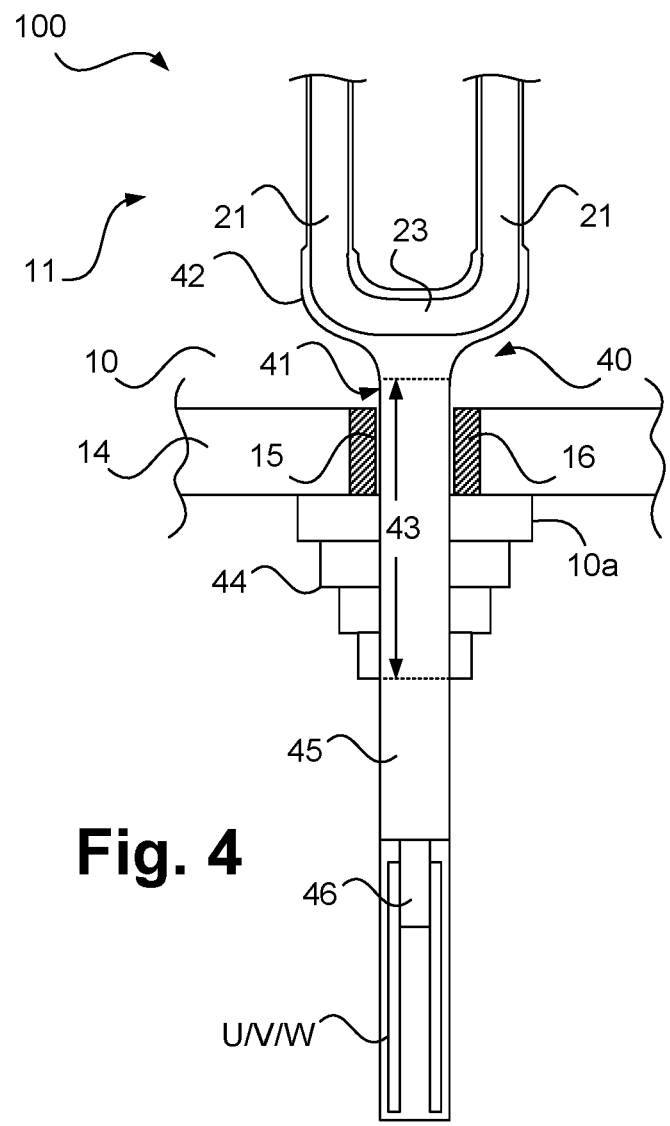
FIG. 4 schematically illustrates a reactor with a current feed arrangement according to an embodiment of the invention.

FIG. 4 shows a detail illustration of the first region 11 of a reactor 100, for example according to FIG. 2, with a current feed arrangement 40 arranged in the first region 11 and a reaction tube 20 connected thereto, the tube sections 21 of which, illustrated in sections here, merge into one another via a U-bend 23.

Here, the U-bend 23 is formed in a contact passage 42 with a reinforced wall, which adjoins the two tube sections 21 in the first region 11. A wall of the contact passage 42, and thus of the U-bend 23, is connected to the already mentioned current feed element designated as a whole by 41, which, as indicated here between dashed lines, has a rod-shaped section 43, which runs in each case at a wall passage 15 through a wall 14 of the reactor vessel 10. Here, the wall passage 15 is shown with an exaggerated width. The rod-shaped section is accommodated in the wall passage 15 so as to be longitudinally movable and, for example, is lined with a suitable insulation material 16.

Optionally, but in no way essential to the invention, a bellows arrangement 44 can be provided on the outside of the wall 14 of the reactor vessel 10 to ensure a gas-tight seal of the reactor vessel 10 against the environment despite the longitudinal mobility of the rod-shaped sections 43.

In the example shown, an additional rod-shaped section 45 adjoins the rod-shaped section 43, the temperature of which section increasingly decreases as the distance from the reactor vessel 10 increases. The additional rod-shaped section merges into a current feed pin 46, to which, for example, two busbars or strands are attached to connect the phases U,V,W or corresponding current connections of a direct current source or of a single-phase alternating current source.

In cracker furnaces, in addition to the reaction tubes 20 previously shown in FIGS. 1 and 2, which are commonly referred to as 6-passage coils, and which comprise six straight tube sections 21 having two 180° bends, i.e., U-bends 23, above or in the second region 12, and three 180° bends, i.e., U-bends 23, below or in the first region 11 (the latter with corresponding current feed arrangements), variants with fewer passages are can also be used. For example, so-called 2-passage coils have only two straight tube sections 21 and only one 180° bend or U-bend 23. When applied to electrical heating, this variant can be regarded as a combination of 6-passage cracker furnace (FIGS. 1 and 2) and reforming furnace (FIG. 3, with reaction tubes without U-bends 23).

The current can be fed in each case in at one point per reaction tube 21 at the lower (or only) U-bend. In each case, M reaction tubes can be electrically coupled to one another, with a phase shift of 360°/M and with a common connecting element 30. In a first alternative, a particularly large connecting element 30 can be used per coil package or for all reaction tubes 20 considered in each case. In a second alternative, however, the use of two smaller-sized connecting elements 30 is also possible.

Figure 5A:
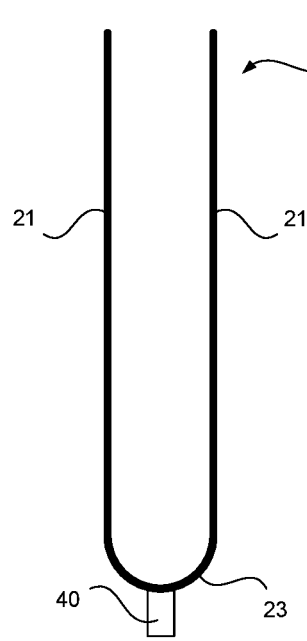
Figures 4C, 5B:
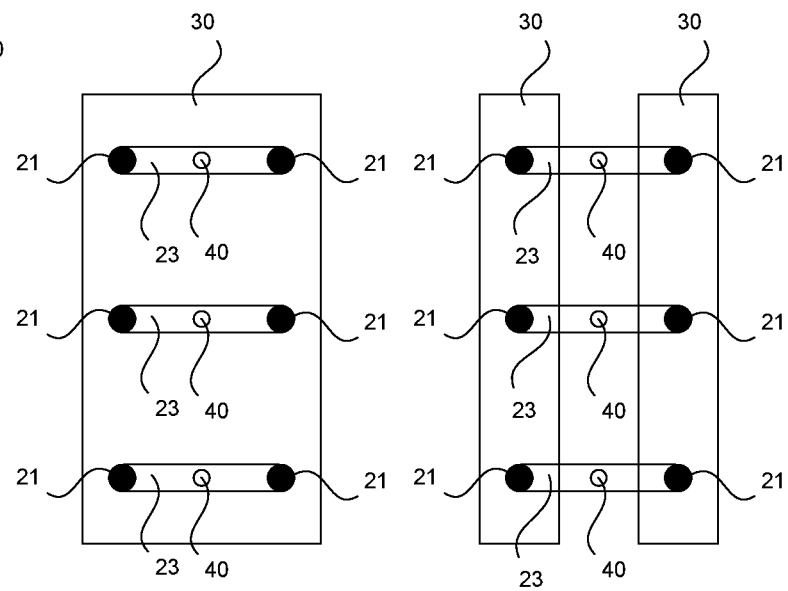

The first alternative just explained is illustrated in FIG. 5B, the second alternative just explained in FIG. 5C in a cross-sectional view through the tube sections 21, wherein a corresponding reaction tube 20 is shown in FIG. 5A in a view perpendicular to the views in FIGS. 5B and 5C. Reference is made to FIG. 1 for the designation of the corresponding elements. It goes without saying that the connecting element or elements 30 with the U-bends 23 possibly arranged there, on the one hand, and the other U-bends 23, on the other hand, with the connections to the phases U, V, W are arranged in different planes corresponding to the first and second regions 11, 12 of a reactor, via the current feed arrangements 40 (shown here in a highly simplified manner). It should be emphasized again that the presence and arrangement of the connecting elements 30 within the scope of the invention is purely optional or arbitrary.

Figure 6A:
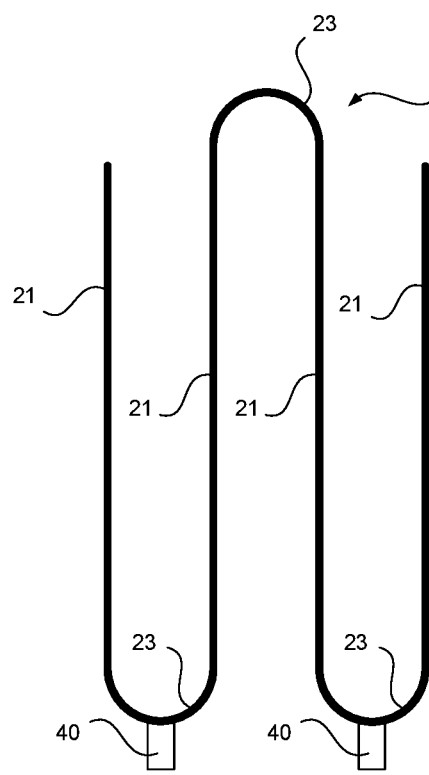
FIGS. 6A and 6B illustrate reaction tubes and corresponding arrangements for use in a reactor according to an embodiment of the invention.
Figure 6B:
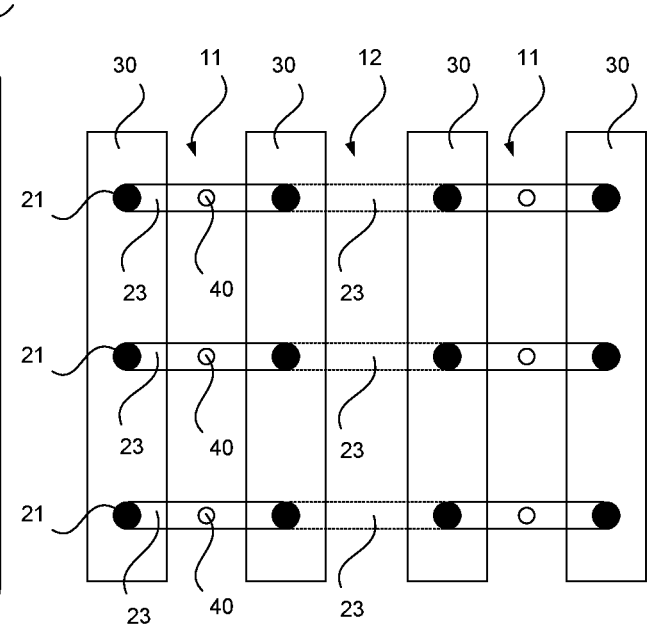

This concept can also be applied correspondingly to coils or reaction tubes 20 having four passages or tube sections 21 (so-called 4-passage coils), in this case with one, two or four star bridges or connecting elements 30. A corresponding example is shown in FIGS. 6A and 6B, four connecting elements 3 being shown in FIG. 6B. For improved illustration, the U-bends 23 are shown here by dashed lines (U-bends in the second region 12 of the reactor) and by unbroken lines (U-bends in the first region 11). For the sake of clarity, the elements are only partially provided with reference symbols.

Reference has already been made to FIGS. 7A to 7C, which illustrate further reaction tubes for use in a reactor according to an embodiment of the invention. The reaction tubes and tube sections are here only in some cases provided with reference symbols. Feed and extraction sections may be deduced from the flow arrows shown. The current feed arrangements 40, which can be present in particular several times and can be formed in the manner explained above, are indicated in a highly simplified manner by dashed lines.

Figure 8:
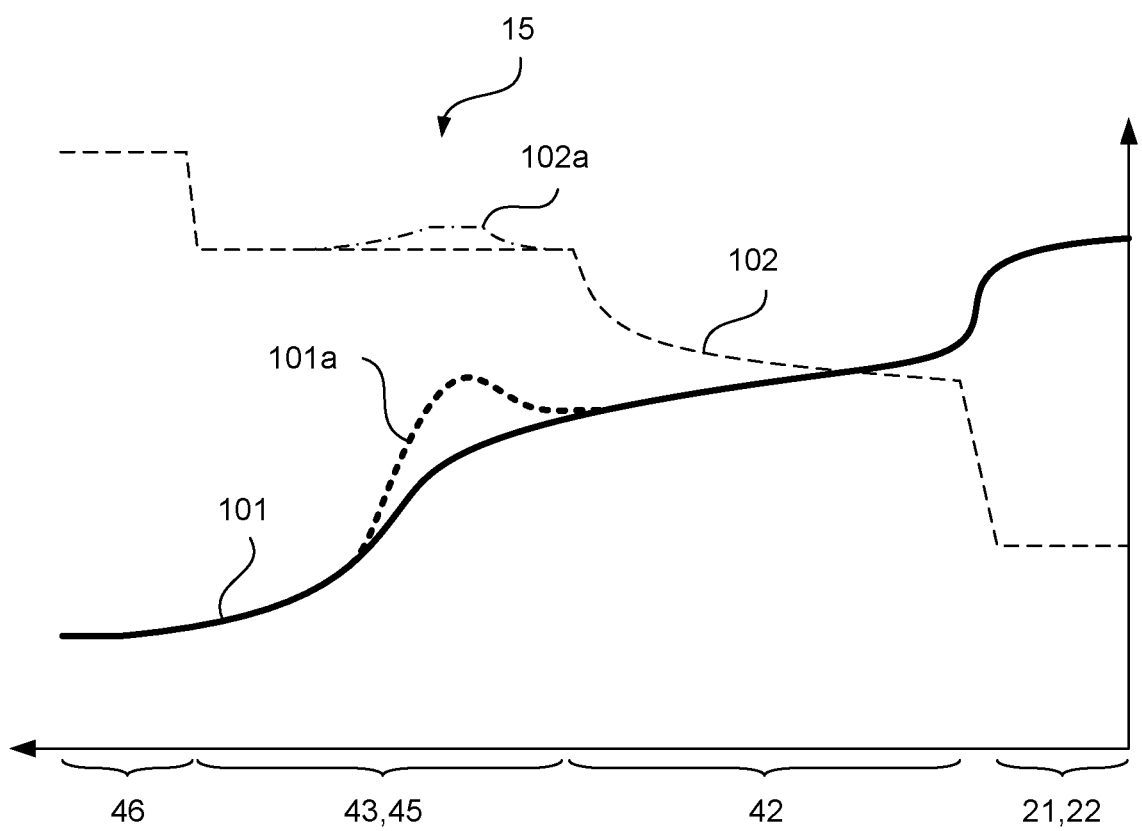
FIG. 8 shows values of thermal and electrical parameters in a current feed arrangement according to an embodiment of the invention.

FIG. 8 illustrates values of thermal and electrical parameters in a current feed arrangement 40 according to a particularly preferred embodiment of the invention, wherein the abscissa shows a value of the temporal root mean square potential (rms value) over the designated elements 46 (current feed pins), 46 and 45 (rod-shaped elements), 42 (contact passage) and 21 and 22 (tube sections), and the ordinate shows a value of the average temperature of cross-sectional or insulating surfaces and the corresponding surface areas. Graph 101 (solid line) illustrates the average temperatures of the cross-sectional areas and graph 102 (dashed line) illustrates the surface areas.

As can be seen, the average temperatures 101 rise and show a jump in an intermediate zone between the contact passage 42 and the tube sections 21 and 22, in particular due to a rapid decrease in cross-section. As shown with dashed or dot-dash regions 101a and 102a, a delimited local temperature increase and a cross-sectional extension can be present in the region of the wall passages 15.

Figure 9:
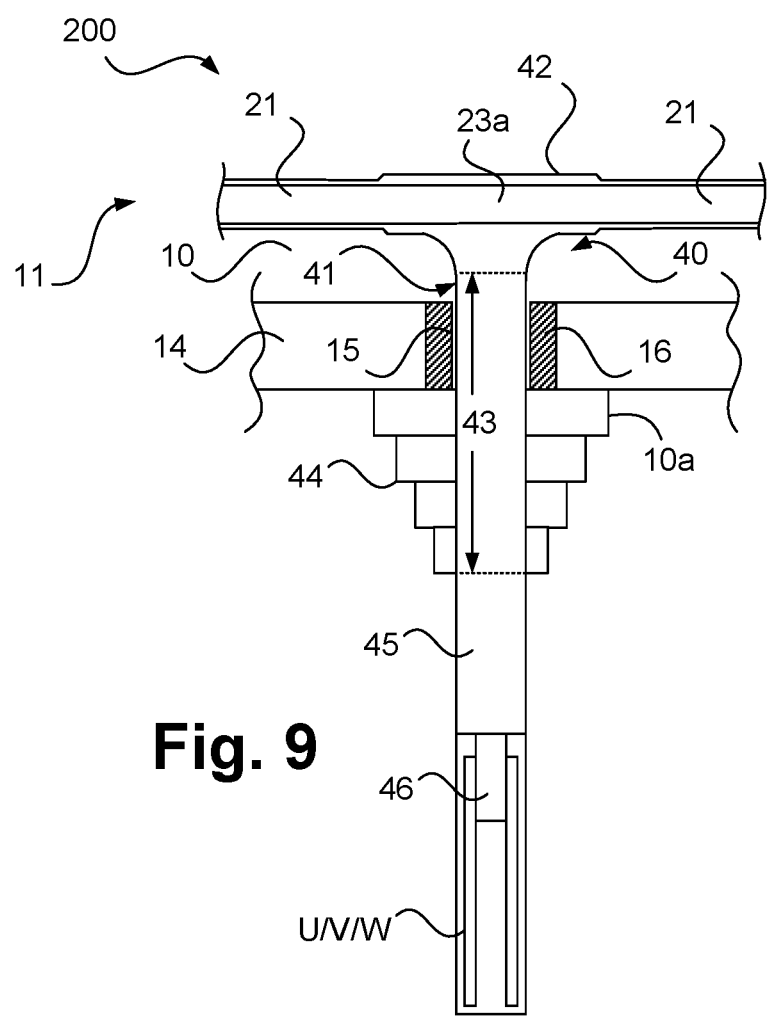
FIG. 9 schematically illustrates a reactor with a current feed arrangement according to an embodiment of the invention.

FIG. 9 shows a detail illustration of the first region 11 of a reactor 200, wherein the elements shown in each case have already been explained in connection with FIG. 4. In contrast to FIG. 4, however, the reaction tube 20 has no U-bend here and the tube sections 21 are arranged along a common central axis. A non-curved transition region is designated by 23a. A corresponding embodiment can be used, for example, instead of a sleeve in the reactor 200 according to FIG. 3.

Here as well, the transition region 23a is formed in a contact passage 42 with a reinforced wall, which adjoins the two tube sections 21 in the first region 11. For further explanations, reference is made to FIG. 4. Here, the wall passage 15 is also shown with an exaggerated width. Here as well, the rod-shaped section is accommodated in the wall passage 15 so as to be longitudinally movable and, for example, is lined with a suitable insulation material 16. However, the wall passage 15 can also have a different configuration in deviation from the illustration shown here, in particular in order to create further movement options. This also relates to the optional bellows arrangement 44.

Many different arrangements of the various components depicted, as well as components not shown, are possible without departing from the spirit and scope of the invention. Embodiments of the invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the invention. Further, it will be understood that certain features and subcombinations are of utility and may be employed within the scope of the disclosure. Further, various steps set forth herein may be carried out in orders that differ from those set forth herein without departing from the scope of the claimed methods. The specification shall not be restricted to the above embodiments. Any units of measurements provided herein are exemplary only and are not meant to specifically define the dimensions of the system.

The invention claimed is:

1. A reactor for carrying out a chemical reaction, comprising:
    a reactor vessel comprising a first region and a second region; and
    one or more reaction tubes, wherein a number of tube sections of the one or more reaction tubes in each case run between the first region and the second region;
    wherein:
        for the electrical heating of the tube sections, the tube sections in the first region in each case are electrically connected to current connections (U, V, W) of a current source by means of flexible connection elements;
        current feed arrangements are provided in the first region of the reactor, to which in each case one or in each case one group of the tube sections are electrically connected, and which each comprise one or more contact passages that in each case adjoins or adjoin at least one of the tube sections in the first region;
        a wall of the contact passages in each case is connected to a current feed element that has a rod-shaped section that runs at a wall passage through a wall of the reactor vessel; and
        the rod-shaped sections of the current feed elements are in each case guided during operation in a longitudinally movable manner in their respective wall passages through the wall of the reactor vessel.

2. The reactor according to claim 1, in which the tube sections are provided in such a number that in each case one or in each case one group of a plurality of the tube sections can in each case be connected to one of the current feed arrangements.

3. The reactor according to claim 1, in which the one or more contact passages are formed in one or more components that is or are attached and firmly bonded to the tube sections in a high-temperature-resistant manner, or in the form of, in each case, a section or a continuous section of the reaction tubes.

4. The reactor according to claim 1, in which the rod-shaped section has in each case a longitudinal extension perpendicular to the wall of the reactor vessel, which is at least twice as large as the largest transverse extension parallel to the wall of the reactor vessel.

5. The reactor according to claim 1, in which the current feed elements each have a free conductor cross-section that, between the respective wall passage of the current feed elements and a point of the wall of the one or more contact passages that is closest to the wall passage and is electrically contacted by the respective current feed elements, is at no point less than 10 square centimeters.

6. The reactor according to claim 1, in which the current feed elements, the contact passages and the tube sections are formed from the same material or from materials whose electrical conductivities differ from one another by no more than 50%.

7. The reactor according to claim 1, in which the current feed elements, the contact passages and the tube sections are formed from a chromium-nickel-steel alloy with 0.1 to 0.5 wt % carbon, 20 to 50 wt % chromium, 20 to 80 wt % nickel, 0 to 2 wt % niobium, 0 to 3 wt % silicon, 0 to 5% tungsten and 0 to 1 wt % other components, wherein the constituents complement each other to form a non-ferrous fraction.

8. The reactor according to claim 1, in which the tube sections are electrically conductively connected as a whole or in groups within the reactor vessel by means of at least one rigid connecting elements.

9. The reactor according to claim 1, in which the reaction tube or tubes have one or more U-bends in the first region of the reactor vessel and the contact passages in the current feed arrangements comprise or form the one or more U-bends in the first region of the reactor vessel.

10. The reactor according to claim 1, in which a plurality of reaction tubes without U-bends run in the first region of the reactor vessel and the contact passages in the current feed arrangements form straight tube sections.

11. The reactor-according to claim 9, which is formed as a reactor for steam cracking.

12. The reactor according to claim 1, in which the flexible connection elements that are attached outside the reactor vessel are made of a different material than the rod-shaped sections of the current feed elements guided in a longitudinally movable manner in their respective wall passages-through the wall of the reactor vessel.

13. The reactor-according to claim 1, in which the wall-through which the rod-shaped sections of the current feed elements are guided in a longitudinally movable manner is an intermediate wall to a separate space in which the rod-shaped sections are contacted with flexible connection elements, and which in turn is delimited by means of a further wall or a plurality of walls.

14. A method for carrying out a chemical reaction, comprising:
   using a reactor, that comprising:
      a reactor vessel; and
      one or more reaction tubes;
      wherein:
         a number of tube sections of the one or more reaction tubes in each case run between a first region and a second region in the reactor vessel;
         for heating the tube sections, the tube sections in the first region are each electrically connected to current connections (U, V, W) of a current source;
         a reactor is used, in which current feed arrangements are provided in the first region of the reactor, to which in each case one or in each case one group of the tube sections are electrically connected, and which each comprise one or more contact passages that in each case adjoins or adjoin at least one of the tube sections in the first region;
         a wall of the contact passages in each case is connected to a current feed element that has a rod-shaped section that runs at a wall passage-through a wall of the reactor vessel;
         the rod-shaped sections of the current feed elements are in each case guided during operation in a longitudinally movable manner in their respective wall passages through the wall of the reactor vessel; and
         the rod-shaped sections of the current feed elements outside the reactor vessel are electrically connected to the current connections (U, V, W) of the current source by means of flexible connection elements.

15. The method according to claim 14, wherein a reactor according to claim 1 is used.

16. The reactor according to claim 2, in which the one or more contact passages are formed in one or more components that is or are attached and firmly bonded to the tube sections in a high-temperature-resistant manner, or in the form of, in each case, a section or a continuous section of the reaction tubes.

17. The reactor according to claim 16, in which the rod-shaped section has in each case a longitudinal extension perpendicular to the wall of the reactor vessel, which is at least twice as large as the largest transverse extension parallel to the wall of the reactor vessel.

18. The reactor according to claim 17, in which the current feed elements each have a free conductor cross-section that, between the respective wall passage of the current feed elements and a point of the wall of the one or more contact passages that is closest to the wall passage and is electrically contacted by the respective current feed elements, is at no point less than 10 square centimeters.

19. The reactor according to claim 18, in which the current feed elements, the contact passages and the tube sections are formed from a chromium-nickel-steel alloy with 0.1 to 0.5 wt % carbon, 20 to 50 wt % chromium, 20 to 80 wt % nickel, 0 to 2 wt % niobium, 0 to 3 wt % silicon, 0 to 5% tungsten and 0 to 1 wt % other components, wherein the constituents complement each other to form a non-ferrous fraction.

20. The reactor according to claim 10, which is formed as a reactor for steam reforming, for dry reforming or for the catalytic dehydrogenation of alkanes.

* * * * *